Feb. 21, 1967  J. F. QUAAS  3,304,604
METHOD FOR PRODUCING CARBIDE CONTAINING MATERIALS
Filed May 11, 1964
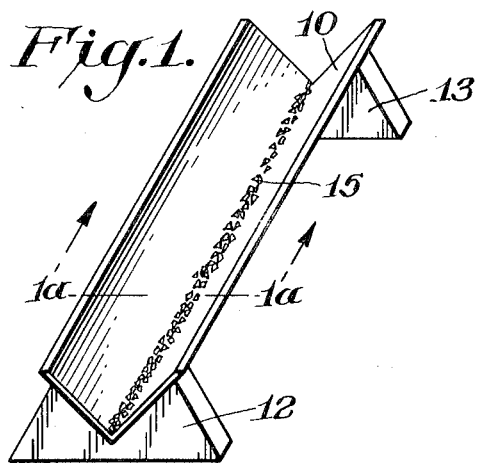
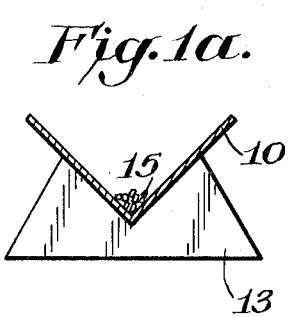
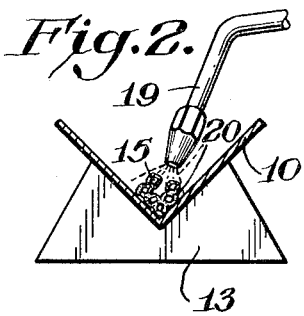
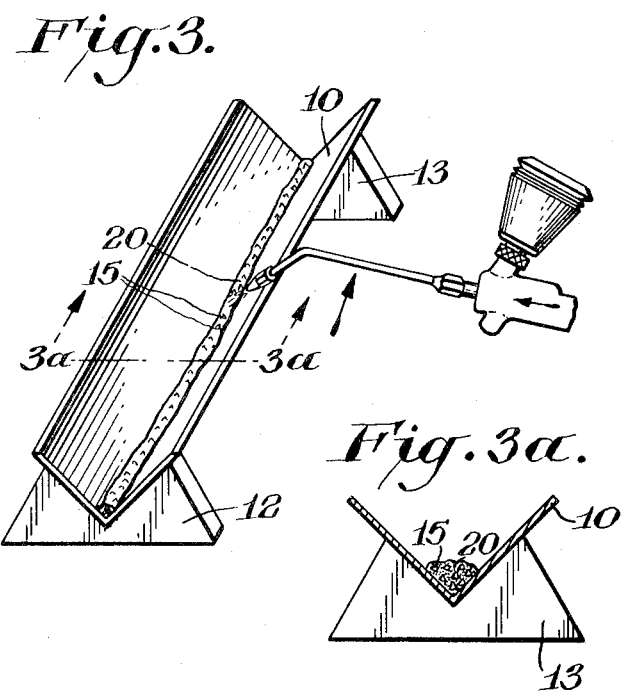
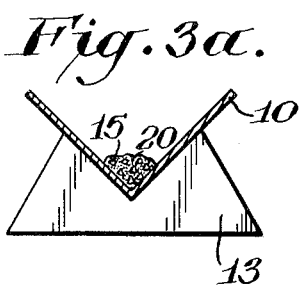
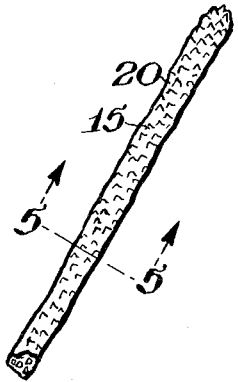
INVENTOR
Joseph F. Quaas
BY Connolly and Hutz
ATTORNEYS 3,304,604
METHOD FOR PRODUCING CARBIDE CONTAINING MATERIALS
Joseph F. Quaas, Island Park, N.Y., assignor to Eutectic Welding Alloys Corporation, a corporation of New York
Filed May 11, 1964, Ser. No. 366,420
8 Claims. (Cl. 29—527)

This invention relates to a method of forming carbide containing materials useful as wear resistant and/or cutting surfaces or useful in depositing such surfaces. More particularly, the invention relates to a method of forming such materials comprising refractory carbide particles uniformly dispersed in a suitable matrix alloy.

Refractory carbides of varying particle size depending on ultimate utilization are used in various industries to provide hard facings extremely resistant to wear or to provide cutting edges. Thus in the mining and oil industries, for example, the refractory carbides are attached to parent materials such as rotary cutting bits, fishing tools, etc., by means of a suitable matrix alloy. Generally speaking, the cutting and/or wear and abrasion surfaces produced by these refractory carbides find use in equipment used for drilling, boring, reaming, earth removing, burning shoes, coring tools, bucket teeth, etc.

The refractory carbide particles may be attached to the parent materials by preplacing the particles in loose form on the parent material and then applying the molten matrix alloy by a heat source such as one of the induction type, an oxy-acetylene torch or a high temperature enclosed furnace. Another method of attaching the refractory carbide particles is by the intermediate formation of a composite type rod which contains the particles of refractory carbide combined within a matrix alloy and then melting the rod over the parent material. In this procedure a heat source such as, for example, an oxy-acetylene torch or the atomic hydrogen process has been used.

In the formation of composite type rods, the general procedure has been to place the particles of refractory carbide in a suitable mold and then by application of heat to a rod consisting of the bonding matrix alloy, melt the rod and deposit the molten matrix alloy by puddling around and over the refractory carbide particles. Once cooled, the composite rod so formed is removed and is ready for use.

During the formation of composite rods or wearing and/or cutting surfaces according to the method of the prior art there is a constant danger of affecting the carbide quality. The formation of such materials requires the application of heat to the refractory particles from the molten matrix in contact therewith. The application of heat effects carbide quality by cracking of the carbide, oxidation and solution of part of the refractory metal and carbon present in the carbide particle. The cracking and oxidation of the refractory particles produce brittle particles unsatisfactory for use in cutting and/or wear surfaces. The solution effect of the refractory metal and the carbon into the matrix alloy and into the parent material detracts from the hardness required and naturally the life of the tool upon which the carbide is attached.

When the prior art method of applying molten matrix alloy to the carbide particles is used, the particles are highly heated due to their contact with relatively large quantities of high temperature molten alloy. The molten alloy must be highly heated in order to obtain sufficient fluidity to surround and firmly bond the particles in a uniform manner. Furthermore, when the molten alloy is applied by puddling the melted alloy from a rod, there is a danger that the molten alloy will not completely surround each particle to obtain a uniform deposit.

Furthermore, by puddling the molten alloy on the particles when forming a composite rod or a hard facing, the particles tend to become dislodged by the weight of the falling molten alloy and, as such, even though a uniform spread of particles was initially used, the resulting deposit or composite rod is not uniform. When a composite rod of non-uniform composition is used to deposit the ultimate coating, the coating is non-uniform. A non-uniform coating tends to produce uneven wearing or/and cutting surfaces and this detracts from the life and usefulness of the tool.

It is an object of this invention to provide a method of forming carbide containing materials which is fast and requires only a short application of heat to the particles. It is a further object to produce such materials by a method which initially costs the carbide particles with a thin coating of matrix alloy thereby providing protection to the particles from the deleterious effects of subsequent contact with molten alloy. It is a further object to produce a uniform distribution of carbide particles which will result in a uniform and even wearing and/or cutting surface. It is an additional object to produce such materials without deleteriously affecting the quality of the refractory carbide particles by the use of high temperature or extended heating. It is additionally an object to provide a method of producing such materials wherein each refractory carbide particle is surrounded completely by the matrix alloy. It is a further object to produce such materials without causing oxidation, cracking or solution of the refractory particles.

In the method according to the invention, refractory carbide particles are uniformly distributed either on the surface of the parent material or in a suitable mold. A matrix alloy is then applied to the refractory particles by flame spraying the matrix alloy over and around the refractory carbide particles by successive passes with a flame spray torch. Upon the first pass with the flame spray torch, the particles are surrounded by the matrix alloy. Since only a small amount of alloy is sprayed by a single pass, the molten alloy quickly solidifies around the particles. The particles are then coated protectively against heat from the second pass which deposits an additional thin coating on and around the particles. Successive passes are made, each time depositing a thin coating on and around the particles, eventually producing the desired material. Each particle is thereby surrounded and contained within the matrix alloy. During application, the particles are not dislodged and remain uniformly distributed. The article now contains a uniform dispersion of refractory carbide particles and is allowed to cool. If a composite rod has been produced it may then be removed from the mold and is ready for use. The resulting rod deposits a uniform and evenly wearing and/or cutting surface. The particles have not suffered oxidation, solutioning or cracking and remain hard and non-brittle.

The novel features and advantages of the present invention will become apparent to one skilled in the art from a reading of the following description in conjunction with the accompanying drawings wherein similar reference characters refer to similar parts and in which FIG. 1 is a top view of an angle iron mold containing refractory carbide particles distributed within the V.

FIG. 1a is a cross section view taken through FIG. 1 at axis 1a.

FIG. 2 is a side view of the angle iron mold showing the application of a matrix alloy by a flame spray torch.

FIG. 3 is a top view of the angle iron mold during application of a matrix alloy by a flame spray torch.

FIG. 3a is a cross section view taken through FIG. 3 at axis 3a.

FIG. 4 is a top view of the composite refractory carbide containing rod produced according to the invention.

FIG. 5 is a cross section view taken through FIG. 5 at axis 5.

FIG. 1 illustrates angle iron mold 10 supported by support members 12 and 13. Refractory carbide particles 15 are spread uniformly within angle iron 10 at the V.

FIG. 1a illustrates the cross section taken through FIG. 1 at 1a. From this figure it can be seen that refractory carbide particles 15 are dispersed evenly along the V formed by the two sides of angle iron 10.

FIG. 2 illustrates the application of molten matrix alloy 20 through flame spray torch 19 onto refractory particles 15. This figure shows an intermediate stage in the production of the composite rod. A pass with the flame spray torch has been made over the particles. As can be seen, the molten matrix alloy surrounds the particles 15 but has not built up sufficiently to form a composite rod.

FIG. 3 illustrates a top view of the application of matrix alloy 20 to refractory carbide particles 15. Flame spray torch 19 applies molten matrix alloy 20 evenly over particles 15. The torch is moved slowly along the particles in successive passes until the desired covering is obtained. By means of successive passes, the temperature of the carbide particles is maintained at the lowest possible temperature. Thus there is obtained a slow build up of matrix alloy on and around the particles in the mold. By means of this slow build up, the heat of the molten alloy is more easily dissipated and the carbide particles are not subjected to high heat.

FIG. 3a illustrates a cross section taken through FIG. 3 at 3a. Here the particles 15 can be seen to be surrounded by the matrix alloy 20.

FIG. 4 illustrates the finished composite rod after it has been cooled and removed from angle iron 10.

FIG. 5 illustrates a cross section taken through FIG. 4 at 5. It will be noted that refractory particles 15 are uniformly dispersed in and surrounded by the now hardened matrix alloy 20.

In the above description, angle iron 10 has been indicated as the mold used to form the composite rod. It is obvious that other molds of suitable size and shape may be employed according to the ultimate use intended. The molds may be of any suitable material which is resistant to heat. Suitable materials include graphite and ceramic as well as the angle iron illustrated in the figures. The angle iron may have its ends closed by a suitable jigging material. The mold may further be preheated prior to the formation of the composite rod.

The above description relates to the production of a composite rod according to the method of this invention. When it is desired to produce a wearing and/or cutting surface by direct application of carbides and matrix alloy without the intermediate production of a composite rod, the procedure is basically the same. The particles of refractory carbides are preplaced upon the surface of the parent material to which the cutting and/or wearing surface is to be applied. The matrix alloy is then applied over the particles by successive passes with a flame spray torch. The matrix alloy is built up until the desired amount of matrix alloy has been applied.

Refractory carbides which may be used in the present invention include carbides of titanium, zirconium, vanadium, chromium, molybdenum, tungsten, tantalum and columbium. These refractory carbides may be used alone or in combination with one another. It has been found that tungsten carbide is a particularly preferred refractory carbide. It has been additionally found that cast tungsten carbide provides a higher resistance to abrasion and wear than rods formed from sintered carbide.

The particle size of the refractory carbides used according to the invention varies depending on the ultimate utility desired. Particle sizes 5/16" to 3/8" and angular in respect to shape are used for superior cutting and drilling performance. Carbide particles in the 20 to 40 mesh range are employed for wear and abrasion resisting applications.

The percentage ratios of refractory carbide particles to matrix alloy will again depend on the individual requirements of the user. Naturally, the higher the proportion of carbide particles, the more wear resistant and the better the cutting qualities result. Generally, improvement is noted with as little as 10 percent carbide particles on a weight basis. The upper limit of weight percent carbide particles depends primarily only on having sufficient matrix alloy to firmly bond the the particles. As little as 5 percent matrix alloy on a weight basis has been found useful for some applications. Generally, a proportion of between 60 and 75 percent carbide particles to 25-40 percent matrix alloy on a weight basis is used.

A particularly suitable carbide particle found useful in the method according to this invention is a precoated tungsten carbide particle disclosed and claimed in application Serial No. 365,503, entitled, "Coated Carbide Particles," filed May 6, 1964, in the names of the instant inventors, the subject matter of which is hereby incorporated by reference.

The particles according to Serial No. 365,503 are coated with a composition comprising an organic or inorganic binder, solvent and a fluxing and protecting agent and then dried. The fluxing and protecting agent is selected from the group consisting of alkali and alkaline earth metal borates as well as boric acid and mixtures of these materials with metal fluorides and chlorides.

While particles according to Serial No. 365,503 are useful, it has been found that uncoated particles are equally effective in the process according to this invention. In fact, since uncoated particles are more highly prone to the dangers of oxidation, solutioning and cracking since they contain no protective coating these particles find substantial utility in the instant invention.

Suitable matrix alloys are well known in the art. Generally speaking, matrix alloys having a predominate amount of nickel, iron, copper or cobalt characterized as nickel, iron, cobalt or copper base alloys have been found particularly useful. Copper-nickel alloys have been used for applying overlays to various parent metals. Nickel-silver and other brass types of alloys have further been used. Matrix alloys containing a relatively high zinc content are subject to fuming and vaporization when heat is applied and this constitutes somewhat of a health hazard.

An alloy matrix containing predominately a metal of the iron-cobalt-nickel group but containing no zinc have been found useful according to this invention. A suitable example of this type of base alloy is as follows:

*Nickel base matrix alloy*

| Constituent | Range in Percent by Weight | Example |
| --- | --- | --- |
| Silicon | 1.5-5.0 | 3.0 |
| Boron | 1.5-5.0 | 2.0 |
| Chromium | 0-20 | 1.0 |
| Molybdenum | 0-7 | 0.2 |
| Nickel | Balance | Balance |

The above alloy may be substituted in nickel content by cobalt or iron. The following matrix alloy is also illustrative of compositions found useful.

*Cobalt base matrix alloy*

| Constituent | Range in Percent by Weight | Example |
|---|---|---|
| Nickel | 1.0–5.0 | 3.0 |
| Chromium | 26.0–32.0 | 28.0 |
| Silicon | 0.5–3.0 | 1.0 |
| Boron | 1.0–3.0 | 2.0 |
| Carbon | 0.8–2.0 | 1.0 |
| Tungsten | 3.5–7.5 | 4.5 |
| Molybdenum | 0.0–5.0 | 3.0 |
| Cobalt | Balance | 57.5 |

Again nickel or iron may be substituted in the above formulation for a like amount of cobalt. The iron alloy is harder and more resistant than the others but is more subject to corrosion and oxidation during deposition.

A particularly preferred copper base matrix alloy containing no zinc which has been found useful has the following constituents in percentages by weight as indicated.

*Copper base alloy*

| Constituent | Broad Range | Intermediate Range |
|---|---|---|
| Nickel | 15.0–40.0 | 20–25 |
| Silicon | 1.0–5.0 | 3.0–4.0 |
| Boron | 0.15–2.50 | 0.25–0.5 |
| Manganese | 0.20–2.00 | 0.5–1.0 |
| Copper | Balance | Balance |

As an example of a matrix alloy within the above ranges there may be mentioned

Constituents: Percent by weight
  Nickel _____ 23.00
  Silicon _____ 3.45
  Boron _____ 0.47
  Manganese _____ 0.75
  Copper _____ Balance Copper base alloys of the above type are disclosed and claimed in copending application Serial No. 300,077, filed August 5, 1963, now abandoned, entitled, "Hard Surfacing Matrix Metal and Composite Rod."

The above illustrated iron, cobalt, copper and nickel base alloys have been found particularly useful because they melt at low temperatures. Thus by using these low temperature matrix alloys, the heat initially used in the melting of the alloys is low and the individual particles are not subject to contact with extremely high heat. The initial low temperatures used combined with the coating and protecting effect of successive passes with the flame spray torch and the easily dissipated heat provide a particularly effective method of preventing oxidation, cracking and solutioning. Furthermore, since no zinc is utilized in these alloy compositions, the health hazard caused by fuming and vaporizing is greatly reduced. Additionally, these compositions firmly bind the carbide particles to the parent material. When the composite rod is ultimately deposited, a hard, shock proof surface is provided and the particles are not easily dislodged.

It has been found useful under certain circumstances to flame spray two or more matrix alloy compositions in the production of composite rods or wearing and/or cutting surfaces in the method according to the invention. The flame spray technique allows the spraying of first one and then another and differently constituted matrix alloy. By this means the operator may select a given range of properties depending on ultimate use. For example, one may first spray a matrix alloy having a low melting temperature onto the carbide particles. Generally the lower the melting point, the softer is the matrix alloy once deposited. The matrix alloy first applied may therefore be one which although relatively soft has a low melting point. By this means, the particles are in contact with lower heat initially and, as such, less oxidation, cracking and solutioning results. Once the first matrix alloy is applied, the build up to ultimate deposit may be accomplished by flame spraying a differently constituted matrix alloy which has a higher melting point and is harder. The matrix alloy first applied provides protection against the deleterious effects of the higher temperature alloy. It coats the carbide particles at a relatively low temperature and prevents their direct contact with the higher melting alloy.

It is clear that various combinations of different matrix alloys may be used in varying percents relative to each other. This depends basically on the ultimate use to which the composite rod or wearing and/or cutting surface is to be put. When, for example, it is desired to coat the particles first with a low temperature alloy and then to finish building up the desired material with a higher melting alloy, the copper base alloys above described may be first applied. Thereafter one or more of the cobalt, nickel or iron base alloys may be flame sprayed in successive passes over the particles.

As a further variation, it has been found useful to apply the refractory carbide particles either by melting the composite rod formed by flame spraying or by flame spraying directly on the parent material. In the first application to the parent material, a copper base alloy may be used. Once this overlay has hardened a second overlay may be applied thereover by the use of any of the iron, cobalt or nickel base alloys illustrated above. The second overlay is applied by the direct application of matrix alloy flame sprayed over preplaced particles. As refractory carbides in this second application cast tungsten carbide particles either coated protectively or non-coated have been found particularly effective. By utilizing this procedure, the user may obtain varying degrees of hardness in the overlay and thus a wide choice becomes available depending on the techniques used and the need arising.

The finished rod produced according to the method of this invention may be used to provide a wear resistant hard facing and/or to provide a cutting surface. The rod composition is deposited by the application of heat to the composite rod. For example, an oxy-acetylene torch with a neutral flame may be used to remelt the matrix alloy containing refractory carbide particles.

The method of the instant invention provides a uniform composite rod or wearing and/or cutting surface without the attendant deleterious effects of high heat or extended heat. The particles thus produced have not suffered excessive oxidation, cracking or solutioning and, therefore, provide highly wear and abrasion resistant and/or cutting surfaces. By spraying the matrix material on the carbides, the temperature to which the carbides are raised is relatively low compared to other methods such as placing carbides in a mold, adding the matrix material and joining by heating in a furnace or by applying a torch. In both furnace and torch procedures, the dwell-time and temperature of application are greater. The individual particles are not subject, during deposition of the matrix alloy thereon, to the contact of large amounts of molten alloy. Since successive passes are used and the matrix alloy is slowly built up around and over the particles, only small amounts of molten alloy are in contact with the particles at a given time. The heat is therefore easily dissipated and the particle does not become extensively heated. Furthermore, the first of the successive passes provides a coating around the particles which protect these particles during the deposit of more molten alloy in successive passes.

By the flame spray technique according to the invention each particle is intimately contacted with matrix alloy and a composite rod of uniform nature results. The particles are not dislodged during the application of the alloy and the material produced has a uniform distribution of carbide particles within the matrix alloy. During ultimate deposition of the composite rod, therefore, a uniformly constituted deposit results which provides hard facings and cutting surfaces of a uniform nature.

The flame spray technique requires only simple equipment. Thus the need for high temperature furnaces for example is done away with. Furthermore, since simple and economical equipment is used, the composite rods and cutting and/or wearing surfaces can be produced both in the field or in the shop. All equipment is highly portable and the materials can thus be prepared at the work-site.

Additionally, the user can, when using the process according to the invention, select the particular matrix material or mixture thereof, carbide, proportions, sizes, etc., so to tailer-make each material for the particular need which arises. Thus the user is not restricted to any one composite rod or cutting and/or wearing surface but may select the composition to suit the particular problem and use involved.

What is claimed is:

1. A method for producing wearing and cutting surfaces comprising distributing refractory carbide particles in a mold, applying a molten metal base matrix alloy selected from the group consisting of copper, iron, cobalt and nickel base matrix alloys and mixtures thereof over the refractory carbide particles by successive passes thereover with a flame spray torch, cooling and solidifying the molten metal base alloy thereby producing a composite rod, removing the composite from the mold, heating and melting the so-formed composite rod to form a mixture of molten matrix alloy and refractory carbide particles, depositing the mixture on a parent material to which the surface is to be applied, thereby producing a base coating, placing additional refractory carbide particles upon the base coating and applying a molten metal base matrix alloy selected from the group consisting of copper, iron, cobalt and nickel base matrix alloys and mixtures thereof over the refractory carbide particles by successive passes thereover with a flame spray torch thereby producing an overlay coating over the base coating, the matrix alloy used in the production of the base coating being of a different constitution from matrix alloy used in the production of the overlay coating.

2. The method according to claim 1 wherein the matrix alloy used to produce the base coating is a copper base alloy.

3. A method according to claim 1 wherein the refractory carbide particles are individually precoated with a binder and a fluxing and protecting agent selected from the group consisting of boric acid, a metal borate, mixtures thereof and mixtures of said metal borates and boric acid with a member selected from the group consisting of a metal fluoride, a metal chloride, and mixtures thereof.

4. A method according to claim 1 wherein the refractory carbide is tungsten carbide.

5. A method according to claim 1 wherein one of the metal base alloy contains the following constituents in the following percents by weight:

| Constituents: | Range in percent by weight |
|---|---|
| Nickel | 15.0–40.0 |
| Silicon | 1.0–5.0 |
| Boron | 0.15–2.50 |
| Manganese | 0.20–2.00 |
| Copper | Balance |

6. A method according to claim 1 wherein one of the metal base alloy contains the following constituents in the following percents by weight:

| Constituents: | Range in percent by weight |
|---|---|
| Nickel | 20–25 |
| Silicon | 3.0–4.0 |
| Boron | 0.25–0.5 |
| Manganese | 0.5–1.0 |
| Copper | Balance |

7. A method according to claim 1 wherein one of the metal base alloy contains the following constituents in the following percents by weight.

| Constituents: | Range in percent by weight |
|---|---|
| Silicon | 1.5–5.0 |
| Boron | 1.5–5.0 |
| Chromium | 0–20 |
| Molybdenum | 0–7 |
| Nickel | Balance |

8. A metal according to claim 1 wherein one of the metal base alloy contains the following constituents in the following percents by weight.

| Constituents: | Range in percent by weight |
|---|---|
| Nickel | 1.0–5.0 |
| Chromium | 26.0–32.0 |
| Silicon | 0.5–3.0 |
| Boron | 1.0–3.0 |
| Carbon | 0.8–2.0 |
| Tungsten | 3.5–7.5 |
| Molybdenum | 0.0–5.0 |
| Cobalt | Balance |

References Cited by the Examiner

UNITED STATES PATENTS

| 1,709,606 | 4/1929 | Catland | 29—504 X |
| 1,955,572 | 4/1934 | Adler et al. | |
| 2,003,019 | 5/1935 | Strobel | 29—495 X |
| 3,122,595 | 2/1964 | Oxley. | |

JOHN F. CAMPBELL, *Primary Examiner.*

P. M. COHEN, *Assistant Examiner.*